US009774895B2

(12) United States Patent
Chang et al.

(10) Patent No.: US 9,774,895 B2
(45) Date of Patent: Sep. 26, 2017

(54) DETERMINING TEXTUAL CONTENT THAT IS RESPONSIBLE FOR CAUSING A VIEWING SPIKE WITHIN A VIDEO IN A DIGITAL MEDIUM ENVIRONMENT

(71) Applicant: Adobe Systems Incorporated, San Jose, CA (US)

(72) Inventors: Walter Wei-Tuh Chang, San Jose, CA (US); Viswanathan Swaminathan, Saratoga, CA (US); Sachin Soni, New Delhi (IN); Russell R. Stringham, Orem, UT (US); Ashish Duggal, Delhi (IN); Anmol Dhawan, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 31 days.

(21) Appl. No.: 15/006,982

(22) Filed: Jan. 26, 2016

(65) Prior Publication Data

US 2017/0214951 A1 Jul. 27, 2017

(51) Int. Cl.
*H04N 7/173* (2011.01)
*H04N 21/24* (2011.01)
*H04N 21/442* (2011.01)
*H04L 29/08* (2006.01)
*H04N 21/85* (2011.01)
*G06F 17/30* (2006.01)
*H04N 5/445* (2011.01)

(52) U.S. Cl.
CPC ....... *H04N 21/24* (2013.01); *G06F 17/30864* (2013.01); *H04L 67/02* (2013.01); *H04L 67/10* (2013.01); *H04N 21/442* (2013.01); *H04N 21/85* (2013.01)

(58) Field of Classification Search
CPC ...... H04N 21/24; H04N 21/442; H04N 21/85; A01B 12/006; H04L 67/10
See application file for complete search history.

(56) References Cited

U.S. PATENT DOCUMENTS

| 8,625,757 | B1 * | 1/2014 | Karpov | 379/112.03 |
| 8,764,561 | B1 * | 7/2014 | Lan | A63F 13/12 463/31 |
| 9,477,993 | B2 * | 10/2016 | Frank | G06N 99/005 |
| 2007/0260519 | A1 * | 11/2007 | Sattley | G06Q 30/02 705/14.41 |
| 2008/0187279 | A1 * | 8/2008 | Gilley | G06Q 30/02 386/250 |

(Continued)

*Primary Examiner* — Pankaj Kumar
*Assistant Examiner* — Reuben M Brown
(74) *Attorney, Agent, or Firm* — Wolfe-SBMC

(57) ABSTRACT

A digital medium environment is described to determine textual content that is responsible for causing a viewing spike within a video. Video analytics data associated with a video is queried. The video analytics data identifies a number of previous user viewing s at various locations within the video. A viewing spike within the video is detected using the video analytics data. The viewing spike corresponds to an increase in the number of previous user viewings of the video that begins at a particular location within the video. Then, text of one or more video sources or video referral sources read by users prior to viewing the video from the particular location within the video is analyzed to identify textual content that is at least partially responsible for causing the viewing spike.

20 Claims, 10 Drawing Sheets

(56) References Cited

U.S. PATENT DOCUMENTS

| | | | |
|---|---|---|---|
| 2008/0313541 A1* | 12/2008 | Shafton | G06F 17/30817 715/725 |
| 2009/0060467 A1* | 3/2009 | Grigsby | G06F 17/30761 386/239 |
| 2010/0039618 A1* | 2/2010 | De Lemos | A61B 3/113 351/209 |
| 2011/0078717 A1* | 3/2011 | Drummond | H04N 21/4586 725/14 |
| 2011/0145726 A1* | 6/2011 | Wei | G06F 17/30796 715/752 |
| 2013/0339130 A1* | 12/2013 | Plut | G06Q 30/02 705/14.45 |
| 2014/0075316 A1* | 3/2014 | Li | G06F 17/30029 715/719 |
| 2016/0140601 A1* | 5/2016 | Blackhurst | G06Q 30/0244 705/14.43 |

* cited by examiner

DETERMINING TEXTUAL CONTENT THAT IS RESPONSIBLE FOR CAUSING A VIEWING SPIKE WITHIN A VIDEO IN A DIGITAL MEDIUM ENVIRONMENT

BACKGROUND

A video provider may provide videos for playback in a digital medium environment, and analytics data may be collected regarding user viewing of the video. Such analytics data may indicate the number of times that the video was viewed at various locations throughout the video. Generally, the number of viewings should be the highest at the beginning of the video, and then gradually decrease as users stop watching the video before the video is finished. For example, analytics data associated with a particular 30 second video, may show that 10,000 users viewed the video at 0 seconds, and that only 5,000 users viewed the video at 15 seconds. This data indicates that of the original 10,000 viewers, just 5,000 of those users continued to watch the video to the 15 second mark.

In some cases, however, analytics data may indicate a viewing spike within the video that corresponds to an increase in user viewings at a particular location within the video. For example, continuing with the example above, the analytics data may show that at 20 seconds, the number of unique users is now 7,500, which represents an increase in 2,500 user viewings from the 5,000 user viewing at 15 seconds. Such viewing spikes are caused by users beginning to view the video from a particular location within the video, other than the beginning location. Video providers and marketers would like to be able to determine the reasons for such viewing spikes.

SUMMARY

A digital medium environment is described to determine textual content that is responsible for causing a viewing spike within a video. Video analytics data associated with a video is queried. The video analytics data identifies a number of previous user viewing s at various locations within the video. A viewing spike within the video is detected using the video analytics data. The viewing spike corresponds to an increase in the number of previous user viewings of the video that begins at a particular location within the video. Then, text of one or more video sources or video referral sources read by users prior to viewing the video from the particular location within the video is analyzed to identify textual content that is at least partially responsible for causing the viewing spike.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
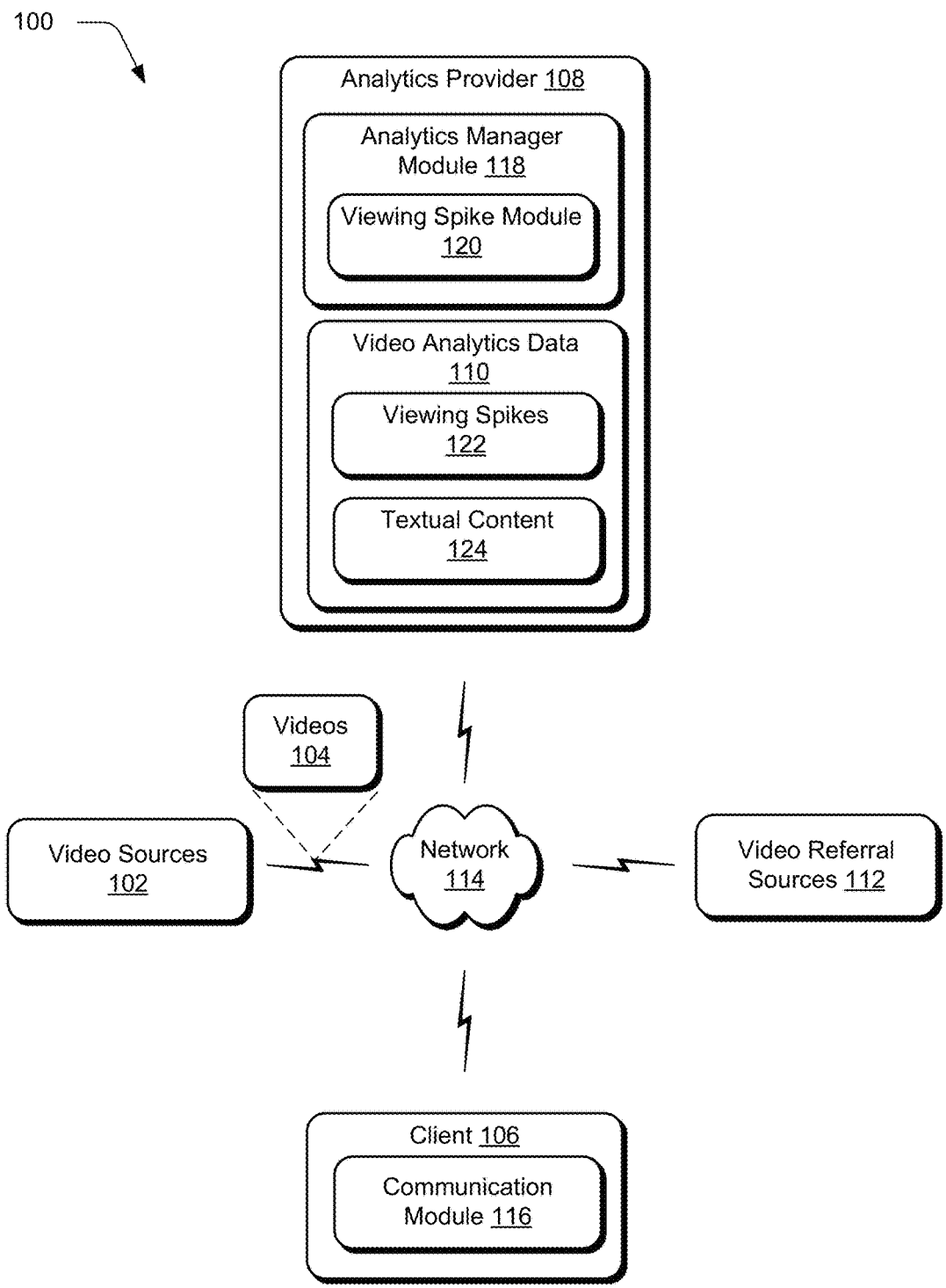
FIG. 1 is an illustration of a digital medium environment in an example implementation that is operable to employ techniques described herein.

A digital medium environment is described to determine textual content that is responsible for causing a viewing spike within a video. Video analytics data associated with a video is queried. The video analytics data identifies a number of previous user viewing s at various locations within the video. A viewing spike within the video is detected using the video analytics data. The viewing spike corresponds to an increase in the number of previous user viewings of the video that begins at a particular location within the video. For example, the analytics data may show that 5,000 users viewed the video at 15 seconds, but that at 20 seconds the number of user viewings increased to 7,500. Thus, a viewing spike can be determined to have occurred at 20 seconds within the video.

Techniques described herein are configured to determine the reasons for such viewing spikes by determining sources that caused users to view the video from the particular location of the viewing spike. To do so, text of one or more video sources or video referral sources read by users prior to viewing the video from the particular location within the video is analyzed to identify textual content (e.g., user comments) that is at least partially responsible for causing the viewing spike. As described herein, video sources correspond to web pages or applications at which the video can be viewed, such as YouTube®, Vimeo®, and so forth. In contrast, video referral sources correspond to web pages or applications that include a link to the video source, such as social media pages (e.g., Facebook® or Twitter®), blog pages, and so forth.

The described techniques can identify textual content that is at least partially responsible for the viewing spike in a variety of different ways. Generally, the textual content is parsed and analyzed to locate words or phrases that are associated with the viewing spike, such as words identifying the particular time or location of the viewing spike or words matching a dialogue that occurs in the video at the viewing spike. For example, textual content can be identified that contains a location that correlates to the particular location of the viewing spike. For example, a user comment may direct users to watch the video from the "1 minute mark" in the video. Thus, if the viewing spike occurs at 1 minute within the video, this user comment may be determined to be at least partially responsible for causing the viewing spike. Alternately or additionally, textual content can be identified that contains words or phrases that match corresponding words or phrases of a video transcript associated with the particular location of the viewing spike. For example, a user comment may direct users to watch the middle of the video to listen to the quote "A sword by itself rules nothing. It only comes alive in skilled hands". In this case, if the video transcript associated with the particular location of the viewing spike includes this quote, then this user comment may be determined to be at least partially responsible for causing the viewing spike.

In order to better understand how the textual content is parsed and analyzed, consider first a simple sentence that states "the scene at 5 minutes is awesome". In this case, the time associated with the viewing spike is known prior to parsing the textual content. Thus, if the viewing spike corresponds to a time of 5 minutes, then the system parses and analyzes the textual content to locate words or phrases that match the viewing spike time of 5 minutes or dialogue that matches the video transcript at 5 minutes. Thus, in this example, the textual content will be detected as being responsible for the viewing spike because the time mentioned in the comment matches the time of the viewing spike.

In some cases, the textual content may have references to multiple time instances or dialogue. For example, the textual content may mention that "the scene at 1 minute is really bad, but the scene at 5 minutes is awesome!" Again, because the particular location of the viewing spike is already known, the system will search for a time associated with the viewing spike. Thus, if the viewing spike corresponds to 5 minutes, the time of 1 minute will be ignored because it does not match the time of the viewing spike. In one or more embodiments, the system may be further configured to determine the sentiment of the textual content. Thus, in the example above, the system could further determine that the sentiment of "the scene at 1 minute is really bad" is negative, and thus is unlikely to have caused a viewing spike. In contrast, the system can determine that the sentiment of "the scene at 5 minutes is awesome" is positive, and thus is likely to have caused the viewing spike.

In an example where the textual content includes a time mention as well as dialogue, the system may determine that both of these mentions contributed to the viewing spike. For example, if the time instance corresponds to the time of the viewing spike, and the dialogue matches the video transcript, then both of these sentences can be determined to be responsible for causing the viewing spike.

In one or more embodiments, multiple instances of textual content may be determined to be at least partially responsible for causing the viewing spike. In this case, for each of the multiple instances of textual content, a contribution score can be determined that indicates the contribution of the particular textual content towards causing the viewing spike. The contribution score may be calculated by dividing the number of viewings caused by a particular instance of the textual content by the total number of viewings of the video from the particular location of the viewing spike. Assume, for example, that there are 20,000 unique viewings from a particular location associated with a viewing spike, 10,000 of which were caused by a first instance of textual content and 5,000 of which were caused by a second instance of textual content. In this case, the contribution score of the first instance of textual content can be calculated to be 0.5 (10,000/20,000) and the contribution score of the second instance of textual content can be calculated to be 0.25 (5,000/20,000).

Then, for each viewing spike, the multiple instances can be provided to a marketer or a video provider in a ranked list, where the list is ranked based on the contribution score. Continuing with the example above, the first instance of textual content (with a contribution score of 0.5) would be ranked ahead of the second instance of textual content (with a contribution score of 0.25). Providing the ranked list of multiple instances of textual content that are least partially responsible for causing the viewing spike enables marketers and video providers to understand the exact reason behind the viewing spikes.

In some cases, marketers and video providers can leverage the textual content, as well as portions of the video associated with the viewing spike, to increase monetization of their video content thereby directly driving more revenue. As an example, relevant tags may be extracted (e.g., hash tags) from the textual content that is at least partially responsible for causing the viewing spike. Such tags may then be associated with videos to increase the number of viewings of the video (e.g., to help the video go viral). In some cases, short video scenes of the video, that includes the particular location corresponding to the viewing spike, may be automatically created. Such short scenes can then be used to promote the video, and are likely to become very popular due to the fact that users have already shown that they are interested in the particular scene. For example, marketers can use the corresponding short scene to market the video, such as by providing the scene on social channels, blogs, media group properties, and so forth.

Example Environment

FIG. 1 is an illustration of a digital medium environment 100 in an example implementation that is operable to employ techniques described herein. The digital medium environment 100 includes video sources 102 at which videos 104 may be viewed by clients 106. An analytics provider 108 is configured to monitor user viewings of videos 104 by clients 106, and provide video analytics data 110 based on the user viewings. The video analytics data 110, for example, may include metrics, statistics, or other information that describes user interactions with the video 104, such as the number of users that viewed the video at particular locations throughout the video. In some cases, user viewings of a video 104 may occur in response to the user navigating to the video source 102 from a video referral source 112. As described herein, video sources 102 correspond to web pages or applications at which the video 104 can be viewed, such as YouTube®, Vimeo®, and so forth. In contrast, video referral sources 112 correspond to web pages or applications that include a link to the video source 102, such as social media pages (e.g., Facebook® or Twitter®), blog pages, and so forth.

Video sources 102, client 106, analytics provider 108, and video referral sources 112 are communicatively coupled, one to another, via a network 114. Computing devices that implement the video sources 102, client 106, analytics provider 108, and video referral sources 112 may be configured in a variety of different ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is described in some instances, the computing device may be representative of a plurality of different devices, such as multiple servers utilized by a business to perform operations "over the cloud" for the analytics provider 108, further discussion of which may be found in relation to FIG. 10.

The client 106 is illustrated as having a communication module 116 that is configured to access the video sources 102 and video referral sources 112 via the network 114, e.g., as web browsers, network enabled applications, and so forth and thus communication between the client and video sources 102 and/or video referral sources 112 is accomplished via access to the network 114 in this digital medium environment for a user of the client to view videos 104.

Although network 114 is illustrated as the Internet, the network may assume a wide variety of configurations. For example, network 114 may include a wide area network (WAN), a local area network (LAN), a wireless network, a public telephone network, an intranet, and so on. Further, although a single network 114 is shown, network 114 may also be configured to include multiple networks.

The analytics provider 108 is illustrated as including an analytics manager module 118 that is representative of functionality to generate the video analytics data 110 based on user viewings of videos 104 by client 106. Generally, video analytics data 110 includes metrics and statistics describing user viewings and interactions with video 104. In some cases, the video analytics data 110 may be provided to users in the form of a video detail report that includes data such as the number of unique viewers that viewed video 104 at particular locations throughout the video.

The video analytics data 110 may also include data identifying the video referral sources 112. For example, if a user navigates from a video referral source 112 to view a video 104, then the URL associated with the video referral source may be collected and stored by analytics provider 108. In this way, the analytics provider 108 can determine the video referral sources 112 that cause users to view videos 104.

The analytics manager module 118 is further illustrated as including a viewing spike module 120 that is representative of functionality to identify viewing spikes 122 within videos 104. As described herein, viewing spikes 122 correspond to an increase in user viewings at a particular location within videos 104. Thus, viewing spike module 120 can identify viewing spikes 122 by analyzing the video analytics data 110 to identify one or more particular locations within video 104 at which the number of user viewings increases. In some cases, the viewing spikes are identified by detecting an increase in unique user viewings which correspond to the number of viewings by unique users, which can be distinguished from total user viewings which may include multiple viewings by a single user. For example, consider a user that rewinds a particular portion of the video 104 to re-watch the particular portion over and over. Each time that this user views the particular portion of the video 104, this would increase the total number of viewings of the particular portion of the video, but the number of unique viewings would remain at 1.

Viewing spike module 120 is further configured to determine reasons for the viewing spikes 122 by analyzing text of the video sources 102 and/or video referral sources 112 read by users prior to viewing the video 104 from the particular location within the video to identify textual content 124 that is at least partially responsible for causing the viewing spike 122. In some cases, the textual content 124 is determined to have been read by users by virtue of the fact that the user viewed video 104 from the particular location of the viewing spike 122 after viewing the textual content 124. Alternately, in some cases an eye tracker may be implemented at client 106 to determine that the textual content 124 has been read if the user views the particular textual content for a time greater than a threshold (e.g., 2 seconds). For example, a viewing spike 122 may occur as the result of textual content 124, such as a user comment, that causes the user to navigate to a particular location within the video 104. The user comment may indicate that a great quote occurs at 1 minute and 30 seconds within a video 104. This comment, therefore, may cause users to begin watching the video 104 at the 1:30 mark within the video 104. As another example, a user comment may indicate particular dialogue or a quote that occurs within the video 104. This comment, therefore, may cause users to seek through the video 104 to locate the particular dialogue or quote.

Thus, viewing spike module 120 can analyze text on video sources 102 and/or video referral sources 112 to determine textual content 124 that matches or corresponds to the particular location of the viewing spike 122. For example, the viewing spike module 120 can use a text analysis engine to parse the textual content 124 to locate words or phrases associated with the particular location of viewing spike 122. For example, viewing spike module can identify location words on video sources 102 or video referral sources 112 that match or correspond to the particular location. Such location words, for instance, could include a specific time (e.g., 1:30) or an approximate time (e.g., "near the middle of the video"). For example, a user comment may direct users to watch the video from the "1 minute mark" in the video. Thus, if the viewing spike occurs at 1 minute within the video, this user comment may be determined to be at least partially responsible for causing the viewing spike. As another example, viewing spike module 120 can identify description words on video sources 102 or video referral sources 112 that match a description or dialogue occurring within the video at the particular location of viewing spike 122. For instance, textual content 124 can be identified that contains words or phrases that match corresponding words or phrases of a video transcript associated with the particular location of the viewing spike 122. For example, a user comment may direct users to watch the middle of the video to listen to the quote "A sword by itself rules nothing. It only comes alive in skilled hands". In this case, if the video transcript associated with the particular location of the viewing spike includes this quote, then this user comment may be determined to be at least partially responsible for causing the viewing spike 122.

Viewing spike module 120 can then provide the textual content 124 that is at least partially responsible for causing a viewing spike 122 to a company or marketer, such as by including this information in a video detail report.

Figure 2:
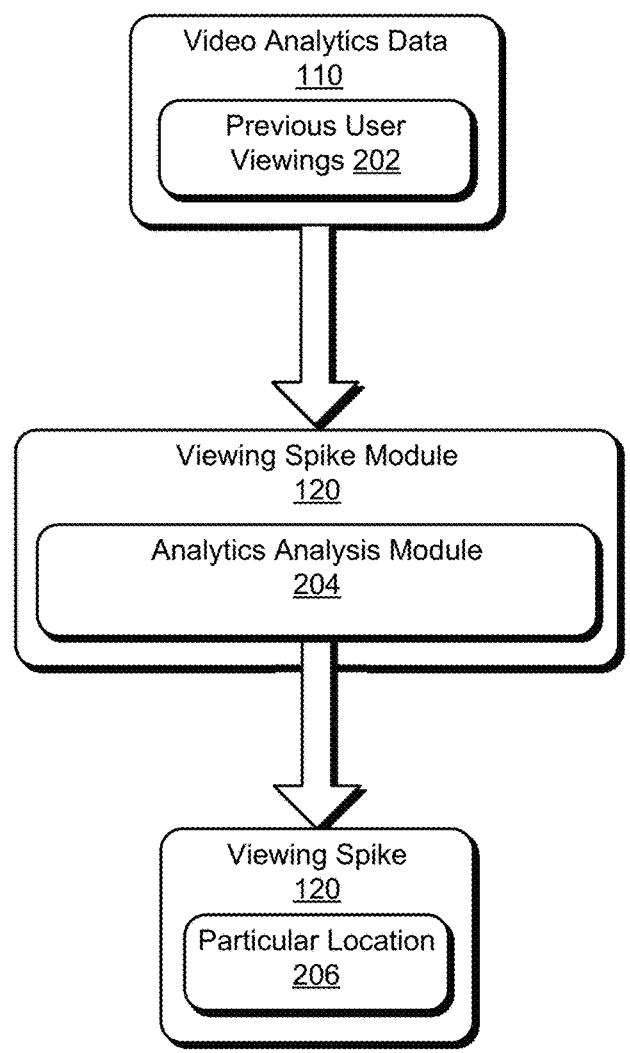
FIG. 2 illustrates a system in an example implementation in which operation of the viewing spike module of FIG. 1 is shown in greater detail as determining a viewing spike within a video.

FIG. 2 illustrates a system 200 in an example implementation in which operation of the viewing spike module 120 of FIG. 1 is shown in greater detail as determining a viewing spike within a video.

In system 200, viewing spike module 120 queries video analytics data 110 associated with a video 104. Generally, the video analytics data 110 provides metrics, statistics, and other information regarding user viewings of video 104. The video analytics data 110 also includes data identifying previous user viewings 202 at various locations within video 104. In some cases video analytics data 110 includes a video detail report.

Figure 3:
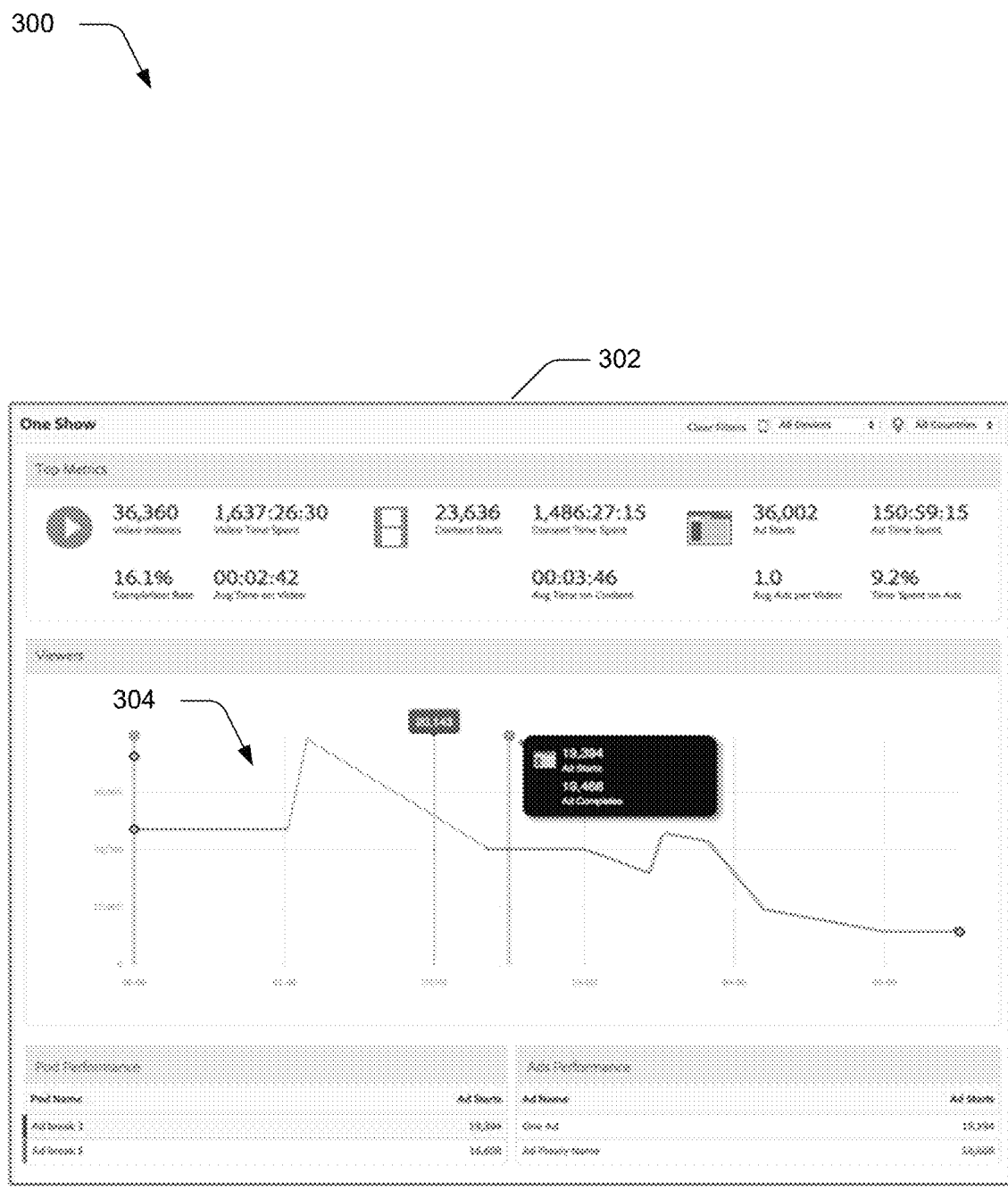
FIG. 3 illustrates an example of a video detail report in accordance with one or more embodiments.

Consider, for example, FIG. 3 which illustrates an example 300 of a video detail report in accordance with one or more embodiments. Video detail report 302 includes various metrics or statistics regarding user viewings of a video. In this example, such metrics include the total number of times the video was initiated for playback, the completion rate of users watching the video, and so forth. In addition, video detail report 302 includes a graph 304 of the number of previous viewings at various locations throughout the video.

Returning to FIG. 2, viewing spike module 120 is illustrated as including an analytics analysis module 204 that is configured to analyze the video analytics data 110 to detect one or more viewing spikes 122. Each viewing spike 122 corresponds to an increase in previous user viewings of the video 104 that begin at a particular location within the video 104. To detect the one or more viewing spikes 122, analytics analysis module 204 determines the particular location 206 (e.g., a time location) within video 104 at which there is an increase in the number of previous user viewings 202. As an example, in FIG. 3, graph 304 shows that there were two sudden jumps in the video viewership, one that occurs around 1 minute into the video, and another that occurs around 3 and ½ minutes into the video. In one or more embodiments, analytics analysis module 204 determines that the increase in previous user viewings corresponds to a viewing spike 122 if the increase corresponds to an increase in unique user viewings that occurs for a threshold period of time (e.g., 5 seconds).

Figure 4:
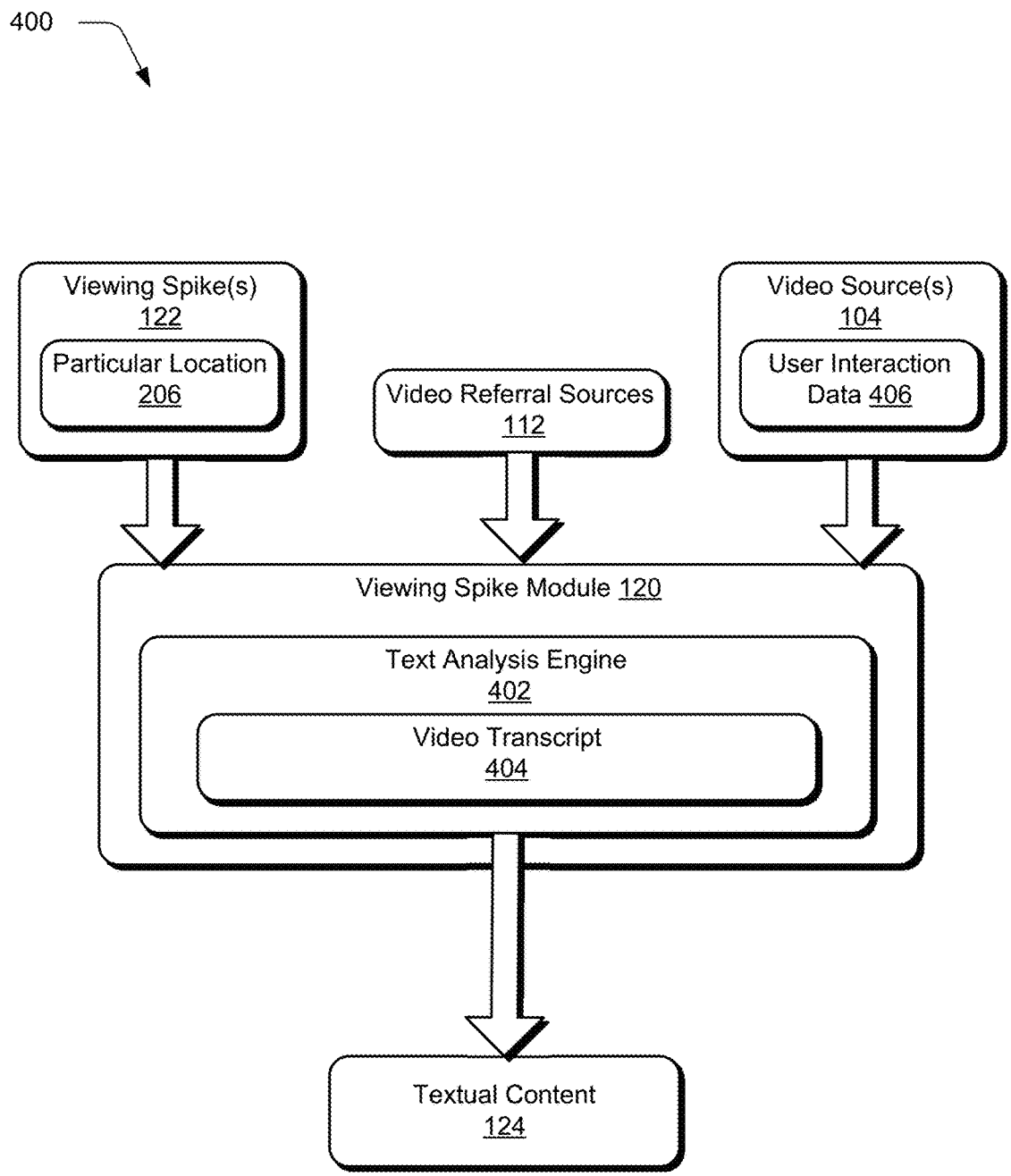
FIG. 4 illustrates a system in an example implementation in which operation of the viewing spike module of FIG. 1 is shown in greater detail as determining textual content that is at least partially responsible for causing the viewing spike within a video.

FIG. 4 illustrates a system 400 in an example implementation in which operation of the viewing spike module 120 of FIG. 1 is shown in greater detail as determining textual content that is at least partially responsible for causing the viewing spike within a video.

In system 400, viewing spike module 120 determines one or more video sources 102 at which the videos 104 were viewed and/or video referral sources 112 that include a link to one of the video sources 102. In some cases, video 104 is hosted at a single video source 102 which can be embedded or shared at various other locations. For example, a video hosted at youtube.com could be embedded for playback at other websites such as facebook.com or various blogs. Analytics provider 108 is configured to detect viewings of video 104 each time that it is viewed directly at video source 104 as well as when it is viewed at other websites. For example, a video provider (e.g., YouTube®) can provide analytics data regarding playbacks of the video both directly from the video source as well as other locations (e.g., Facebook®). In some cases the video 104 can be hosted by multiple video sources 102, in which case analytics provider 108 can be implemented to monitor video viewings at each of the video sources 102. Viewing spike module 120 knows the video sources 102 at which the video 104 is hosted, since video sources 102 correspond to web pages or applications from which the video 104 can be played back for viewing. In addition, when a user navigates from a particular video referral source 112 to a web page or application at which the video is located, analytics manager module 118 can detect the URL of the referring web page (e.g., using an existing analytics provider such as Google® analytics). In this way, viewing spike module 120 is able to determine the various vide referral sources 112 from which users were referred to view the video 104.

In system 400, viewing spike module 120 is illustrated as including a text analysis engine 402 that is configured to analyze text of the video sources 102 or video referral sources 112 read by users prior to viewing the video 104 from the particular location 206 within video 104, to identify textual content 124 that is at least partially responsible for causing the viewing spike 122.

In one or more embodiments, text analysis engine 402 analyzes the text to identify textual content that contains a location that correlates to the particular location 206 of the viewing spike 122. To do so, text analysis engine 402 analyzes the text to locate words or descriptions that correspond to a location or time within the video. Such location words or phrases may include specific times or locations within the video 104. For example, text analysis engine may locate words asking the user to navigate to the specific location of "1:32 within the video". In addition, such location words or phrases may include words or phrases that indicate a general or probable location within video 104. For example, text analysis engine may locate words asking the user to navigate to the "middle of the video", the "end of the video", and so forth.

If location words or phrases are located, then the text analysis engine 402 compares the location words or phrases to the particular location 206 associated with the viewing spike 122. Then, if the location of the textual content matches the particular location 206 of the viewing spike 122, text analysis engine 402 determines the textual content is at least partially responsible for causing the viewing spike 122.

Figure 5:
FIG. 5 illustrates an example of a video referral source with a selectable link to a video source at which a video can be viewed.

Consider, for example, FIG. 5 which illustrates an example 500 of a video referral source 112 with a selectable link to video source 102 at which video 104 can be viewed. In example 500, a video referral source 502 is illustrated as a social post to a social network site such as Facebook®. The post includes a link to watch "The Legend of Zorro" at a video source 102 associated with the web page crackle.com. The social post also includes a comment 504 by a user that states "Watch Zorro face at "0:30:24" when she speaks 'Nobody leaves my tequila worm dangling in the wind'. In this case, if the particular location 206 of viewing spike 122 matches the location or time of "0:30:24" that is mentioned in comment 504, then text analysis engine 402 will attribute the viewing spike 122 to comment 504.

In one or more embodiments, text analysis engine 402 analyzes the text to identify textual content that contains words or phrases that match corresponding words or phrases of a video transcript 404 associated with the particular location 206 of viewing spike 122. To do so, text analysis determines uses the video transcript 404 to determine words or phrases that occur around the particular location 206 of the video spike 122 in video 104. Then, text analysis engine analyzes the text of video sources 102 or video referral sources 112 to identify words or phrases that match the words or phrases of the video. If a match is found, text analysis engine 402 can determine that the textual content 124 is at least partially responsible for causing the viewing spike 122.

Figure 6:
FIG. 6 illustrates an additional example of a video referral source with a selectable link to a video source at which a video can be viewed.

Consider, for example, FIG. 6 which illustrates an additional example 600 of a video referral source 112 with a selectable link to video source 102 at which a video 104 can be viewed. In example 600, a video referral source 602 is illustrated as a social post to a social network site such as Facebook®. The post includes a link to watch "Crouching Tiger, Hidden Dragon" at a video source 102 associated with the web page crackle.com. The social post also includes a comment 604 by a user that states "What a dashing dialogue almost in the middle of the movie—A sword by itself rules nothing. It only comes alive in skilled hands". In this case, if the particular location 206 of viewing spike 122 includes text that matches this dialogue from the movie, then text analysis engine 402 will attribute the viewing spike 122 to comment 604.

In one or more embodiments, text analysis engine 402 may be configured to increase the efficiency and speed of the text analysis by identifying relevant text on the video source 102 or video referral source 112. For the video referral source 112, text analysis engine may first identify a link to video source 102, and then search text that is proximate the link, since this text is likely to have caused the user to select the link. For example, a user comment may include a suggestion to watch a particular location of the video 104 along with a link to the video source 102 at which video 104 may be viewed. Then, text analysis engine parses the web page to identify the link and determines the relevant textual content as the text that is positioned proximate the link (e.g., included in the same comment as the link). In this way, rather than analyzing all of the text on the video referral page 112, text analysis engine 402 analyzes just a portion of the text that occurs proximate the link.

For video sources 102, text analysis engine 402 may query user interaction data 406 corresponding to user interactions with the one or more video sources 102. Based on the user interaction data 406, text analysis engine 402 can determine one or more particular sections of textual content 124 (e.g., one or more comments) read by users just prior to viewing the video 104 from the particular location 206 of the viewing spike 122. Then, rather than analyzing all of the textual content of a video source 102, text analysis engine 402 can analyze just the one or more particular sections of the textual content 124 to determine whether they are responsible for viewing spike 122.

In one or more embodiments, the user interaction data 406 may include scroll data that indicates the particular textual content 124 (e.g., comment) read by users prior to viewing the video from the particular location 206 of the viewing spike 122. For example, a scroll tracker, which monitors scrolling and/or cursor movement, can be implemented at client 106, to generate the scroll data based on the user's scrolling behavior. Such scroll data may include a scroll position prior to the user viewing the video 104. Based on the scroll position, text analysis engine 402 can determine the content that was rendered on the user's screen prior to viewing the video. The scroll data may also include the time spent at the scroll position. For example, if user stopped at a scroll position for more than a threshold time, then text analysis engine 402 can determine that the user did so to read the textual content.

Alternately or additionally, the user interaction data 406 may include eye tracking data that indicates the particular textual content 124 (e.g., comment) read by users prior to viewing the video 104 from the particular location 206 of the viewing spike 122. For example, an eye tracker may be implemented at client 106 to precisely determine the textual content 124 that user has read or skimmed just prior to viewing the video 104 from the particular location 206 associated with viewing spike 122.

Generally, an eye tracker is configured to implement eye tracking techniques to identify the portions of textual content 124 viewed by the user by measuring either the point of gaze where the user is looking and/or the motion of an eye relative to the user's head. Assume, for example, that a user is reading textual content 124 containing predominantly horizontal text. In this case, the eye tracker can determine the number of fixations on the page and the (x,y) coordinate of each fixation. Based upon the (x,y) coordinate of fixations, the eye tracker can determine DELTA Y and DELTA X for every two consecutive fixations, where DELTA Y=|Y2−Y1| and DELTA X=|X2−X1|. When the user is reading horizontally DELTA X will be above a threshold and DELTA Y will be smaller or close to zero. Hence, eye tracker is able to identify the specific portions or regions of the textual content 124 that is read by the user as those regions with a high concentration of fixations.

In some cases, there may be multiple instances of textual content that are determined to be at least partially responsible for viewing spike 122. Viewing spike module 120 is configured to calculate a contribution score of each instance of textual content, such that the instances of textual content can be ranked based on the relative number of viewings the textual content generated.

Figure 7:
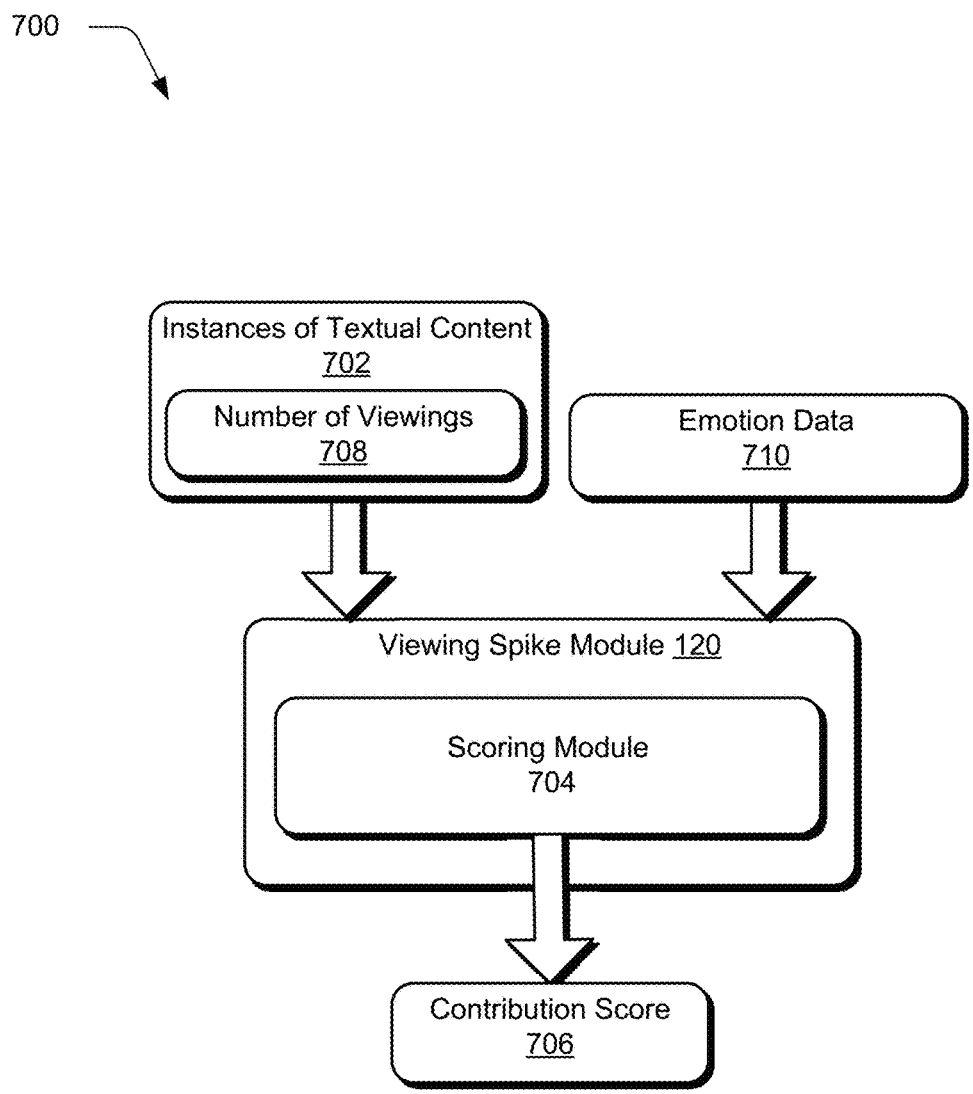
FIG. 7 illustrates a system in an example implementation in which operation of the viewing spike module of FIG. 1 is shown in greater detail as calculating a contribution score for multiple instances of textual content that are each at least partially responsible for causing the viewing spike within the video.

Consider, for example, FIG. 7 which illustrates a system 700 in an example implementation in which operation of the viewing spike module 120 of FIG. 1 is shown in greater detail as calculating a contribution score for multiple instances of textual content that are each at least partially responsible for causing the viewing spike within the video.

In system 700, multiple instances of textual content 702, that have been identified as being at least partially responsible for the viewing spike 122, are determined by viewing spike module 120, as described above. Then, for each instance of textual content 702, a scoring module 704 calculates a contribution score 706 indicating the contribution of the textual content 702 to the viewing spike 122.

In one or more embodiments, the contribution score 706 is based on the number of viewings 708 of video 104, from the particular location 206 of the viewing spike 122, that were caused by the particular instance of textual content 802 (e.g., the number of users that viewed the video from the viewing spike location after reading a particular comment). For a particular instance of textual content 702, scoring module 704 can calculate the contribution score by dividing the number of viewings 708 caused by the particular instance of textual content 702 by the total number of viewings of video 104 from the particular location 206 associated with the viewing spike 122.

Assume, for example, that there are 20,000 unique viewings from a particular location associated with a viewing spike, 10,000 of which were caused by a first instance of textual content and 5,000 of which were caused by a second instance of textual content. In this case, the contribution score of the first instance of textual content can be calculated to be 0.5 (10,000/20,000) and the contribution score of the second instance of textual content can be calculated to be 0.25 (5,000/20,000).

In one or more embodiments, the contribution score 706 may be calculated based at least in part on emotion data 710 that indicates emotional reactions of users after reading a particular instance of textual content 702. The emotional reactions of users may be captured using a face reader implemented at client 106. A face reader can be implemented to analyze user facial expressions to determine emotions, such as happy, sad, scared, disgusted, surprised, and angry.

Thus, a face reader may be implemented to detect facial features of a user after reading a particular instance of textual content 702 (e.g., a comment) to determine if user liked or disliked the textual comment and/or the portion of the video. Scoring module 704 may query the emotion data that indicates the emotional reaction of users to various instances of textual content. Then, scoring module 704 may increase the contribution score 706 of instances of textual content 702 that cause positive emotional responses, such as happiness, surprise, and so forth.

The instances of textual content 702 may then be provided to users, such as by including the instances of textual content 702 in a video detail report. In one or more embodiments, for each viewing spike 122, a ranked list of the instances of textual content 702 may be generated, such that the textual content is ranked based on respective contribution scores 706. Continuing with the example above, the first instance of textual content (with a contribution score of 0.5) would be ranked ahead of the second instance of textual content (with a contribution score of 0.25). Providing the ranked list of multiple instances of textual content that are least partially responsible for causing the viewing spike enables marketers and video providers to understand the exact reason behind the viewing spikes 122.

In one or more embodiments, relevant tags may be extracted (e.g., hash tags) from the textual content that is at least partially responsible for causing the viewing spike 122. For example, tags may be extracted from the textual content that is responsible for the viewing spike by identifying keywords or phrases in the textual content that led to the viewing spike. Such tags may then be associated with videos 104 to increase the number of viewings of the video 104 (e.g., to help the video go viral). For example, due to the popularity of the scene associated with the viewing spike, users are likely to search for this scene using a search engine. Thus, associating the relevant tags with the video will increase the likelihood that the video will pop up in the search results.

In one or more embodiments, viewing spike module 120 is further configured to automatically create a short scene of video 104 that includes the particular location 206 corresponding to the viewing spike 122. Such short scenes can then be used to promote the video, and are likely to become very popular due to the fact that users have already shown that they are interested in this particular scene. Consider, for example, that a user comment "See venom is coming at 1:10 minute", that is associated with the Spiderman 3 movie, drove huge traffic to this scene the Spiderman 3 movie. In this case, marketers can use the corresponding short scene to market the movie, such as by providing the scene on social channels, blogs, media group properties, and so forth.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

Figure 8:
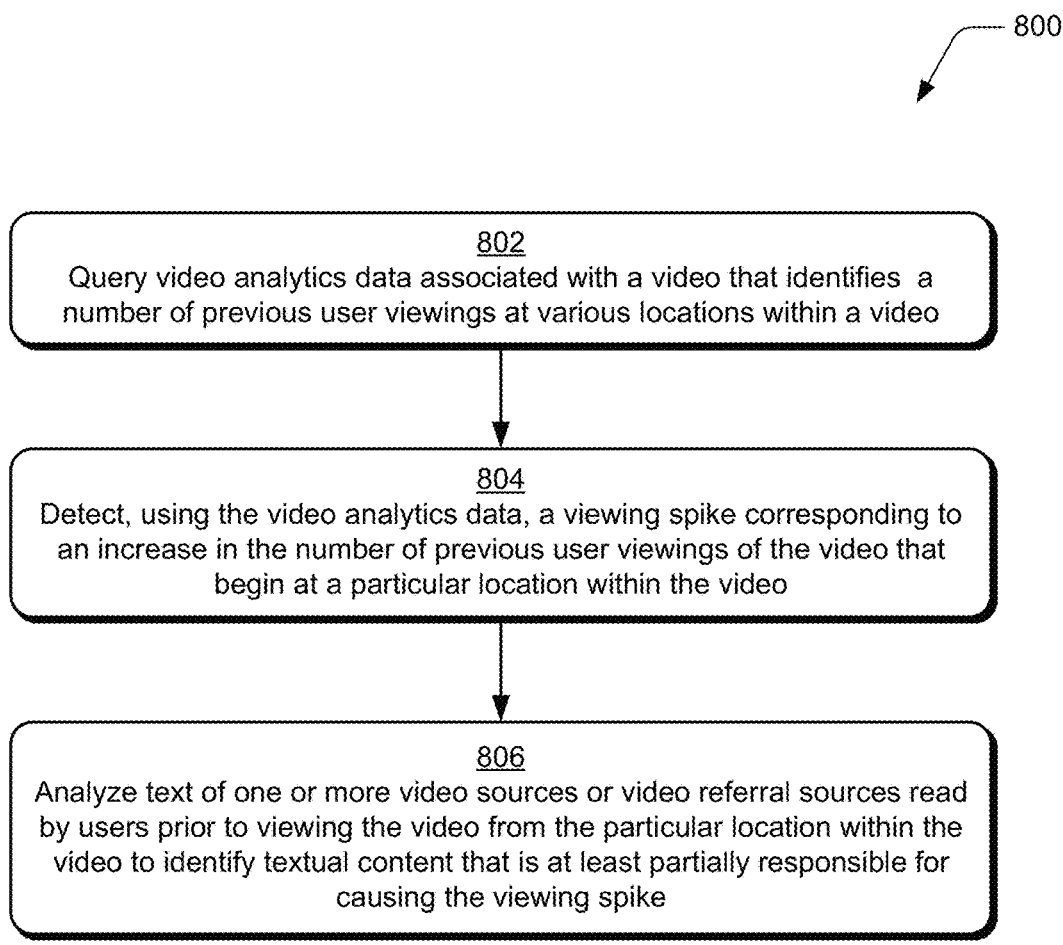
FIG. 8 depicts a procedure in an example implementation in which textual content that is at least partially responsible for causing a viewing spike within a video is determined.

FIG. 8 depicts a procedure 800 in an example implementation in which textual content that is at least partially responsible for causing a viewing spike within a video is determined.

At 802, video analytics data associated with a video that identifies a number of previous user viewings at various locations within the video is queried. For example, viewing spike module 120 queries video analytics data 110 that identifies a number of previous user viewings 202 at various locations within video 104.

At 804, a viewing spike corresponding to an increase in the number of previous user viewings of the video that begin at a particular location within the video is detected using the video analytics data. For example, analytics analysis module 204 detects a viewing spike 122 within the video 104 using the video analytics data 110. The viewing spike 122 corresponds to an increase in unique user viewings of the video 104 that begin at a particular location 206 within the video.

At 806, text of one or more video sources or video referral sources read by users prior to viewing the video from the particular location within the video is analyzed to identify textual content that is at least partially responsible for causing the viewing spike. For example, text analysis engine 402 analyzes text of one or more video sources 102 or video referral sources 112 read by users prior to viewing the video 104 from the particular location 206 within the video to identify textual content 124 that is at least partially responsible for causing the viewing spike 122.

Figure 9:
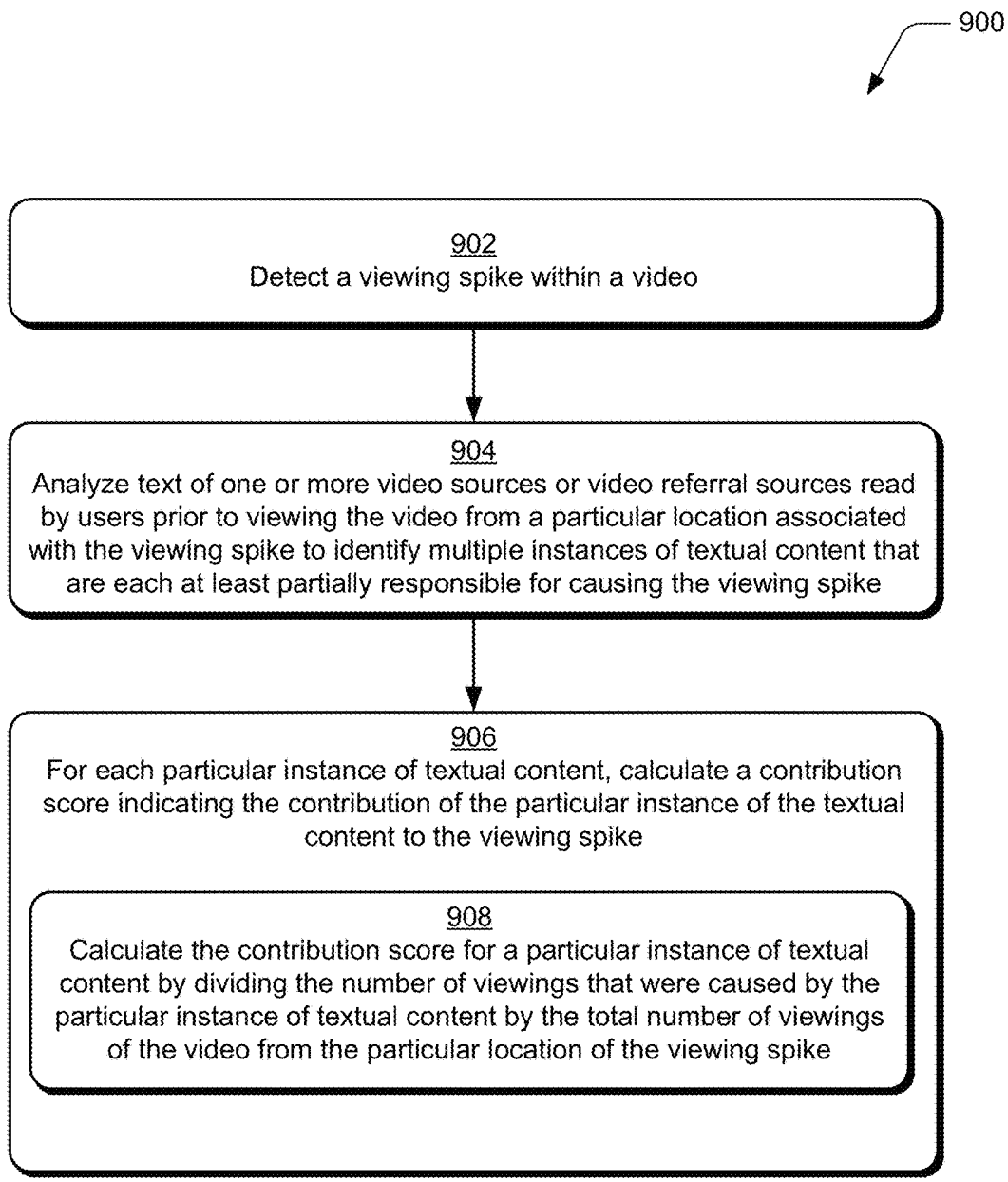
FIG. 9 depicts a procedure in an example implementation in which a contribution score is generated for multiple instances of textual content that are each at least partially responsible for causing a viewing spike within a video.

FIG. 9 depicts a procedure 900 in an example implementation in which a contribution score is generated for multiple instances of textual content that are each at least partially responsible for causing a viewing spike within a video.

At 902, a viewing spike is detected within a video. For example, analytics analysis module 204 detects a viewing spike 122 within the video 104.

At 904, text of one or more video sources or video referral sources read by users prior to viewing the video from a particular location within the video is analyzed to identify multiple instances of textual content that are each at least partially responsible for causing the viewing spike. For example, text analysis engine 402 analyzes text of one or more video sources 102 or video referral sources 112 read by users prior to viewing the video 104 from the particular location 206 within the video to identify multiple instances of textual content 702 that is at least partially responsible for causing the viewing spike 122.

At 906, for each particular instance of textual content, a contribution score is calculated that indicates the contribution of the particular instance of textual content to the viewing spike. For example, scoring module 704 calculates a contribution score for each of the multiple instances of textual content 702. In some case, at 908, the contribution score for a particular instance of textual content is calculated by dividing the number of viewings that were caused by the particular instance of textual content by the total number of viewings of the video from the particular location of the viewing spike.

Example System and Device

Figure 10:
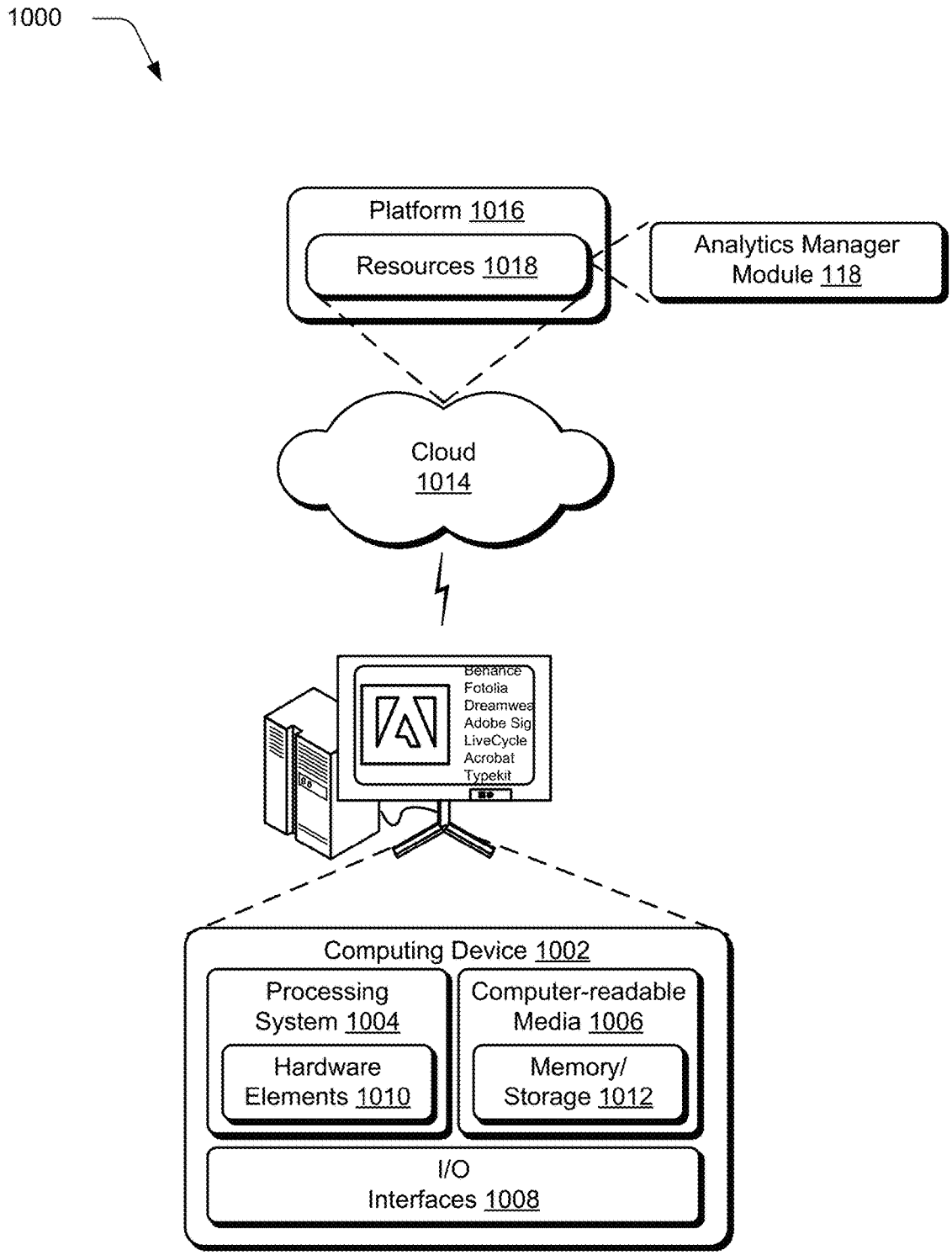
FIG. 10 illustrates an example system that includes an example computing device that is representative of one or more computing systems and/or devices that may implement the various techniques described herein.

FIG. 10 illustrates an example system generally at 1000 that includes an example computing device 1002 that is representative of one or more computing systems and/or devices that may implement the various techniques described herein. This is illustrated through inclusion of the analytics manager module 118. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to determine textual content that is at least partially responsible for causing a viewing spike within a video, a method implemented by at least one computing device comprising:
   querying, by the at least one computing device, video analytics data associated with the video, the video analytics data identifying for each of a plurality of locations within the video, a number of users that viewed the video at the location within the video;
   detecting, by the at least one computing device and based on the video analytics data, a viewing spike within the video, the viewing spike corresponding to an increase in the number of users that viewed the video at a particular location in the video relative to a location in the video that precedes the particular location in the video;
   analyzing, by the at least one computing device, text of at least one video source or video referral source read by users prior to viewing the video at the particular location within the video to identify textual content that is at least partially responsible for causing the viewing spike; and
   automatically generating, by the at least one computing device, a short scene from the video that includes the particular location in the video corresponding to the viewing spike.

2. The method as described in claim 1, wherein the textual content comprises user comments regarding the video at the video source or the video referral source.

3. The method as described in claim 1, wherein the at least one video source comprises at least one of a web page or an application at which the video is located, and wherein the at least one video referral source comprises at least one of a web page or an application that includes a link to one of the video sources.

4. The method as described in claim 1, wherein the identifying the textual content further comprises identifying textual content that contains a location that correlates to the particular location of the viewing spike.

5. The method as described in claim 1, wherein the identifying the textual content further comprises identifying textual content that contains words or phrases that match corresponding words or phrases of a video transcript associated with the particular location of the viewing spike.

6. The method as described in claim 5, wherein the analyzing further comprises:
   querying user interaction data corresponding to user interactions with the at least one video source or video referral source;
   determining, based at least in part on the user interaction data, at least one particular comment read by users at the video source or the video referral source prior to viewing the video from the particular location of the viewing spike; and
   analyzing the at least one particular comment to determine whether the at least one particular comment is at least partially responsible for causing viewing spike.

7. The method as described in claim 6, wherein the user interaction data comprises scroll tracking data that indicates the at least one particular comment read by users prior to viewing the video from the particular location of the viewing spike.

8. The method as described in claim 6, wherein the user interaction data comprises eye tracking data that indicates the at least one particular comment read by users prior to viewing the video from the particular location of the viewing spike.

9. The method as described in claim 1, further comprising extracting relevant tags from the textual content that is at least partially responsible for the viewing spike, and associating the relevant tags with the video to increase the number of viewings of the video.

10. In a digital medium environment to determine a contribution score for multiple instances of textual content that are each at least partially responsible for causing a viewing spike within a video, a method implemented by at least one computing device comprising:
    detecting, by the at least one computing device, the viewing spike within the video, the viewing spike corresponding to an increase in a number of previous user viewings of the video that begin at a particular location within the video relative to a location in the video that precedes the particular location in the video;

analyzing, by the at least one computing device, text of at least one or more video source or video referral source read by users prior to viewing the video from the particular location within the video to identify multiple instances of textual content that are each at least partially responsible for causing the viewing spike;

for each particular instance of textual content, calculating by the at least one computing device a contribution score indicating the contribution of the particular instance of textual content to the viewing spike; and extracting, by the at least one computing device, relevant tags from the textual content that is at least partially responsible for the viewing spike and associating the extracted tags with searchable data associated with the video to increase a likelihood that the video will appear in search engine results.

11. The method as described in claim 10, wherein the calculating the contribution score for the particular instance of textual content comprises:

determining a number of viewings of the video, from the particular location of the viewing spike, that were caused by the particular instance of textual content;

determining a total number of viewings of the video from that particular location of the viewing spike; and calculating the contribution score for the particular instance of textual content by dividing the number of viewings that were caused by the particular instance of textual content by the total number of viewings.

12. The method as described in claim 10, further comprising generating a ranked list of the multiple instances of textual content that are at least partially responsible for causing the viewing spike, the multiple instance of the textual content ranked based at least in part on the contribution scores.

13. The method as described in claim 10, wherein the contribution score is calculated based at least in part on emotion data that indicates emotional reactions by users after reading the particular instance of textual content.

14. In a digital medium environment to determine user comments that are at least partially responsible for causing a viewing spike within a video, a system implemented at least partially in hardware, the system comprising:

a viewing spike module implemented at least partially in hardware to query video analytics data associated with the video, the video analytics data identifying unique user viewings at various locations within the video;

an analytics analysis module to detect a viewing spike within the video using the video analytics data, the viewing spike corresponding to an increase in unique user viewings of the video that begin at a particular location within the video relative to a location in the video that precedes the particular location in the video;

a text analysis engine to analyze user comments read by users prior to viewing the video from the particular location within the video to identify at least one user comment that is at least partially responsible for causing the viewing spike; and a communication module to extract a relevant tag from the identified at least one user comment and associate the extracted relevant tag with searchable data associated with the video to increase a likelihood that the video will appear in search engine results.

15. The system as described in claim 14, further comprising a scoring module configured to calculate a contribution score for the at least one user comment that is at least partially responsible for causing the viewing spike, the contribution score indicating the contribution of the user comment to the viewing spike.

16. The system as described in claim 15, wherein the scoring module is configured to calculate the contribution score of each of the at least one user comment by dividing a number of viewings that were caused by a particular instance of textual content by a total number of viewings from the particular location associated with the viewing spike.

17. The system as described in claim 16, wherein the scoring module is further configured to generate a ranked list of the at least one user comment that is at least partially responsible for causing the viewing spike, the at least one user comment ranked based at least in part on the contribution scores.

18. The system as described in claim 14, wherein the text analysis engine is configured to identify the at least one user comment by identifying at least one user comment that contains a location that correlates to the particular location of the viewing spike or that contain words or phrases that match corresponding words or phrases of a video transcript associated with the particular location of the viewing spike.

19. The system as described in claim 14, wherein the video sources comprise web pages or applications at which the video is located, and wherein the video referral sources comprise web pages or applications that include a link to one of the video sources.

20. The method as described in claim 10, further comprising generating, by the at least one computing device, a short scene from the video that includes the particular location within the video corresponding to the viewing spike.

* * * * *

UNITED STATES PATENT AND TRADEMARK OFFICE
CERTIFICATE OF CORRECTION

PATENT NO. : 9,774,895 B2  
APPLICATION NO. : 15/006982  
DATED : September 26, 2017  
INVENTOR(S) : Chang et al.

Page 1 of 1

It is certified that error appears in the above-identified patent and that said Letters Patent is hereby corrected as shown below:

On the Title Page

Item [57], Line 5, after "number of previous user", delete "viewing s", insert -- viewings --, therefor.

Signed and Sealed this  
Twenty-eighth Day of November, 2017

Joseph Matal  
*Performing the Functions and Duties of the*  
*Under Secretary of Commerce for Intellectual Property and*  
*Director of the United States Patent and Trademark Office*